(12) United States Patent
Pidutti et al.

(10) Patent No.: US 9,343,955 B2
(45) Date of Patent: May 17, 2016

(54) ACTIVE POWER FACTOR CORRECTOR CIRCUIT

(71) Applicant: Infineon Technologies AG, Neubiberg (DE)

(72) Inventors: Albino Pidutti, Villach (AT); Andrea Carletti, Munich (DE)

(73) Assignee: Infineon Technologies AG, Neubiberg (DE)

( * ) Notice: Subject to any disclaimer, the term of this patent is extended or adjusted under 35 U.S.C. 154(b) by 406 days.

(21) Appl. No.: 13/755,518

(22) Filed: Jan. 31, 2013

(65) Prior Publication Data

US 2014/0211526 A1    Jul. 31, 2014

(51) Int. Cl.
*H02M 1/42* (2007.01)
*G05F 1/70* (2006.01)
*H02M 1/00* (2006.01)

(52) U.S. Cl.
CPC .... *H02M 1/4225* (2013.01); *H02M 2001/0025* (2013.01); *Y02B 70/126* (2013.01)

(58) Field of Classification Search
CPC ... H02M 1/42; H02M 1/4208; H02M 1/4225; H02M 7/217; Y02B 70/12; Y02B 70/126
USPC ................... 323/205, 207; 363/89
See application file for complete search history.

(56) References Cited

U.S. PATENT DOCUMENTS

| 5,886,586 | A | 3/1999 | Lai et al. | |
|---|---|---|---|---|
| 6,728,121 | B2 * | 4/2004 | Ben-Yaakov et al. | 363/89 |
| 8,278,899 | B2 * | 10/2012 | Schafmeister et al. | 323/283 |
| 2011/0115458 | A1 | 5/2011 | Schafmeister et al. | |

FOREIGN PATENT DOCUMENTS

CN    102025274 A    4/2011

OTHER PUBLICATIONS

Todd, Philip C., "Boost Power Factor Corrector Design with the UC3853," Application Note U-159, Unitrode Corporation, Texas Instruments Incorporated, 1999; pp. 1-24.
"Modelling, Analysis and Compensation of the Current-Mode Converter," Unitrode Application Note U-97, Unitrode Corporation, Texas Instruments Incorporated, 1999, pp. 1-7.
Andreycak, Bill, "Power Factor Correction Using the UC3852 Controlled On-Time Zero Current Switching Technique," Application Note U-132, Unitrode Corporation, Texas Instruments Incorporated, 1999, 17 pages.
"Practical Considerations in Current Mode Power Supplies," Unitrode Application Note U-111, Unitrode Corporation, Texas Instruments Incorporated, 1999; 19 pages.
Todd, Philip C., "UC3854 Controlled Power Factor Correction Circuit Design," Unitrode Application Note U-134, Unitrode Corporation, Texas Instruments Incorporated, 1999; 21 pages.
Andreycak, Bill, "Optimizing Performance in UC3854 Power Factor Correction Applications," Unitrode Design Note DN-39E, Unitrode Corporation, Texas Instruments Incorporated, 1999; 6 pages.
Noon, James P., "Designing High-Power Factor Off-Line Power Supplies," Texas Instruments Incorporated, 2003; 36 pages.
Cohen, Isaac et al., "High Power Factor and High Efficiency—You Can Have Both," Texas Instruments Power Supply Design Seminar, Topic 1, SEM-1800, 2008; 13 pages.
Gegner, J., et al., "Linear Peak Current Mode Control: A Simple Active Power Factor Correction Control Technique for Continuous Conduction Mode," 27th Annual IEEE Power Electronics Specialists Conference, vol. 1, Jun. 23-27, 1996, pp. 196-202.

* cited by examiner

*Primary Examiner* — Gary L Laxton
(74) *Attorney, Agent, or Firm* — Slater Matsil, LLP (57) ABSTRACT

An electronic device includes a controller configured to apply slope compensation to a reference signal in a power factor corrector. The device also configured to adjust the slope compensation based on an input voltage of the power factor corrector.

21 Claims, 7 Drawing Sheets

Figure 4 ced signals 150 and 152 to

ACTIVE POWER FACTOR CORRECTOR CIRCUIT

TECHNICAL FIELD

The present invention relates to the field of circuits, in particular to active power factor corrector circuits.

BACKGROUND

In electronic devices, power factor corrector (PFC) circuits are increasingly used to increase the power factor (PF) of AC electric power systems. In electronic power systems, a load with a low power factor draws more current than a load with a high power factor for the same amount of useful power transferred. When the power factor is low, the high current causes energy to be lost in the distribution system, requiring larger wires and other equipment capable of handling the higher current compared to a system with a higher power factor.

Because of the costs of larger equipment and wasted energy, electrical utilities will charge a higher cost to industrial or commercial customers who have a low power factor than to those who have a higher power factor. Power factor regulations are also becoming increasingly prevalent.

Power factor correction may be especially relevant for high power applications. At a high power, small differences in power factor can lead to significant cost savings. High power electronic power systems are becoming increasingly important in AC electric power systems.

A power factor corrector may be implemented using a switched-mode power supply. Power factor corrector circuits often perform slope compensation to prevent oscillations and maintain stability. However, slope compensation can reduce the power factor of power factor corrector circuits.

SUMMARY OF THE INVENTION

In accordance with an embodiment, an electronic device includes a controller configured to apply slope compensation to a reference signal in a power factor corrector. The device is also configured to adjust the slope compensation based on an input voltage of the power factor corrector.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an active PFC circuit. The invention may also be applied, however, to other types of circuits and systems, such as power supply circuits and systems.

The power factor, a dimensionless number between zero and one, is defined as the ratio of the real power flowing to the load to the apparent power in the circuit. Real power is the capacity of the circuit to perform work at a particular time, while apparent power is the product of the current and the voltage of the circuit. Due to energy stored in the load and returned to the source and due to a non-linear load that distorts the wave shape of the current drawn from the source, the apparent power tends to be greater than the real power.

A power factor correction (PFC) circuit may be active or passive. A passive PFC circuit includes inductors and/or capacitors. An active PFC circuit, on the other hand, is a power electronic system that changes the wave-shape of the current drawn by a load to improve the power factor. In a power factor corrected circuit, the voltage and current are more in phase and the amount of reactive power is reduced.

Active PFC circuits may be implemented using boost converters, buck converters, buck-boost converters, or other topologies. Active PFC circuits can operate in various modes, including continuous conduction mode (CCM), discontinuous conduction mode (DCM), critical conduction mode (CRM), and other modes of operation.

In an embodiment, slope compensation is adjusted, for example, by increasing a signal level of the slope compensation depending on an instantaneous voltage level of the AC input signal. At low instantaneous voltage levels, the current input of the power factor becomes distorted because the slope compensation causes the current to further depart from the AC input voltage waveform. Such distortion results in the loss of power factor. By increasing the level of the slope compensation at these low input levels, the current signal more closely follows the AC input voltage waveform. Consequently, the power factor is also improved.

Figure 1A:
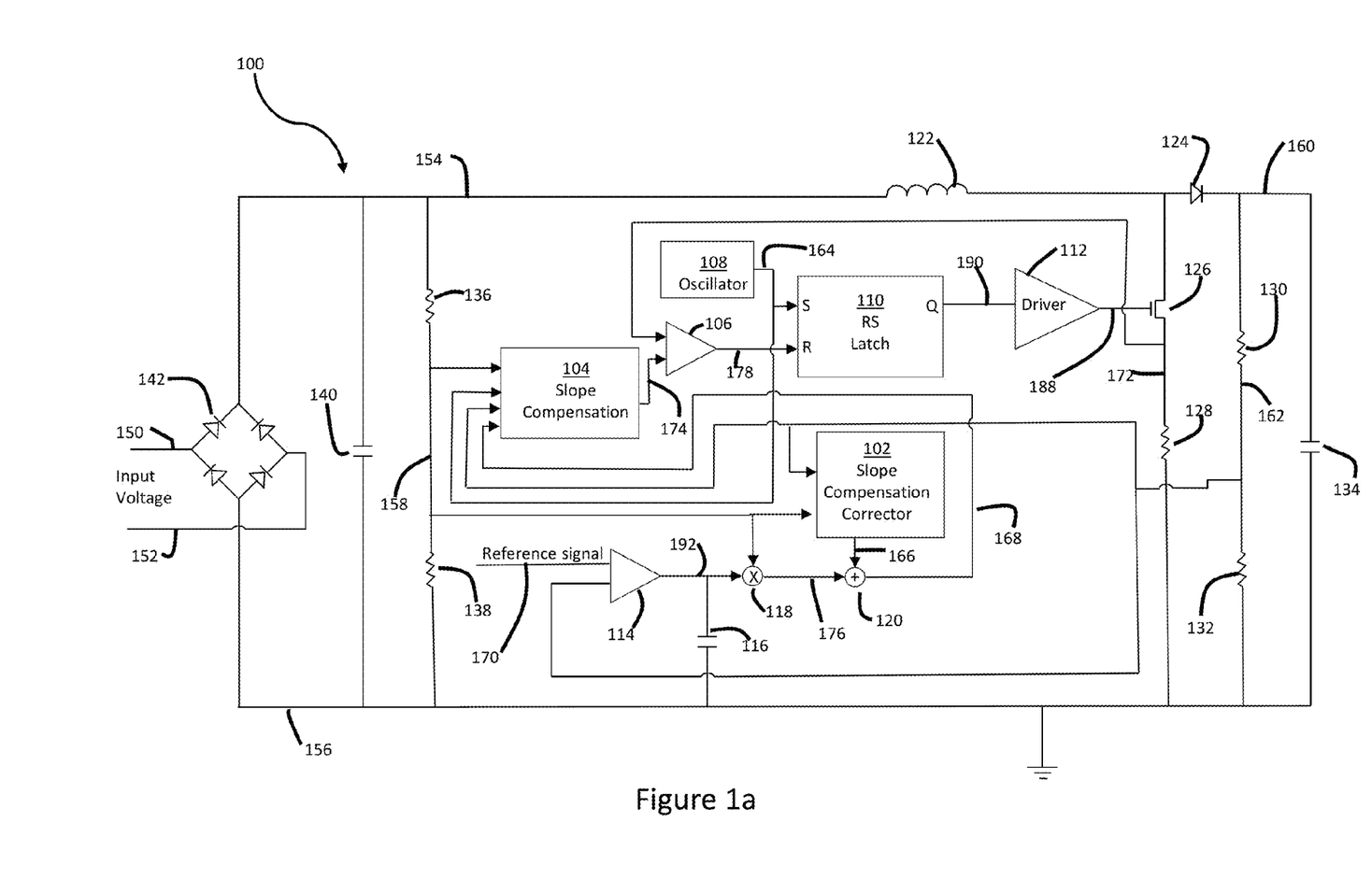
FIGS. 1a-c illustrate an embodiment of an active PFC circuit.
Figure 1B:
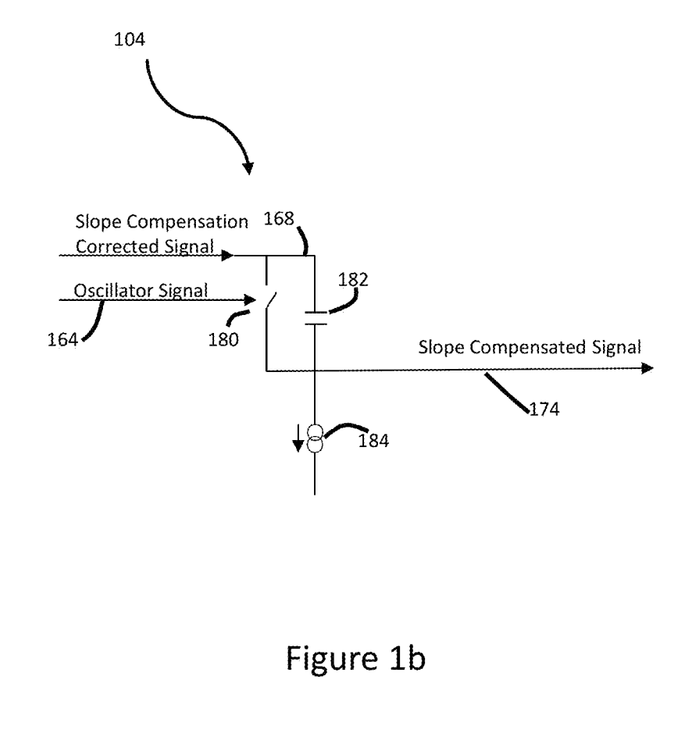
Figure 1C:
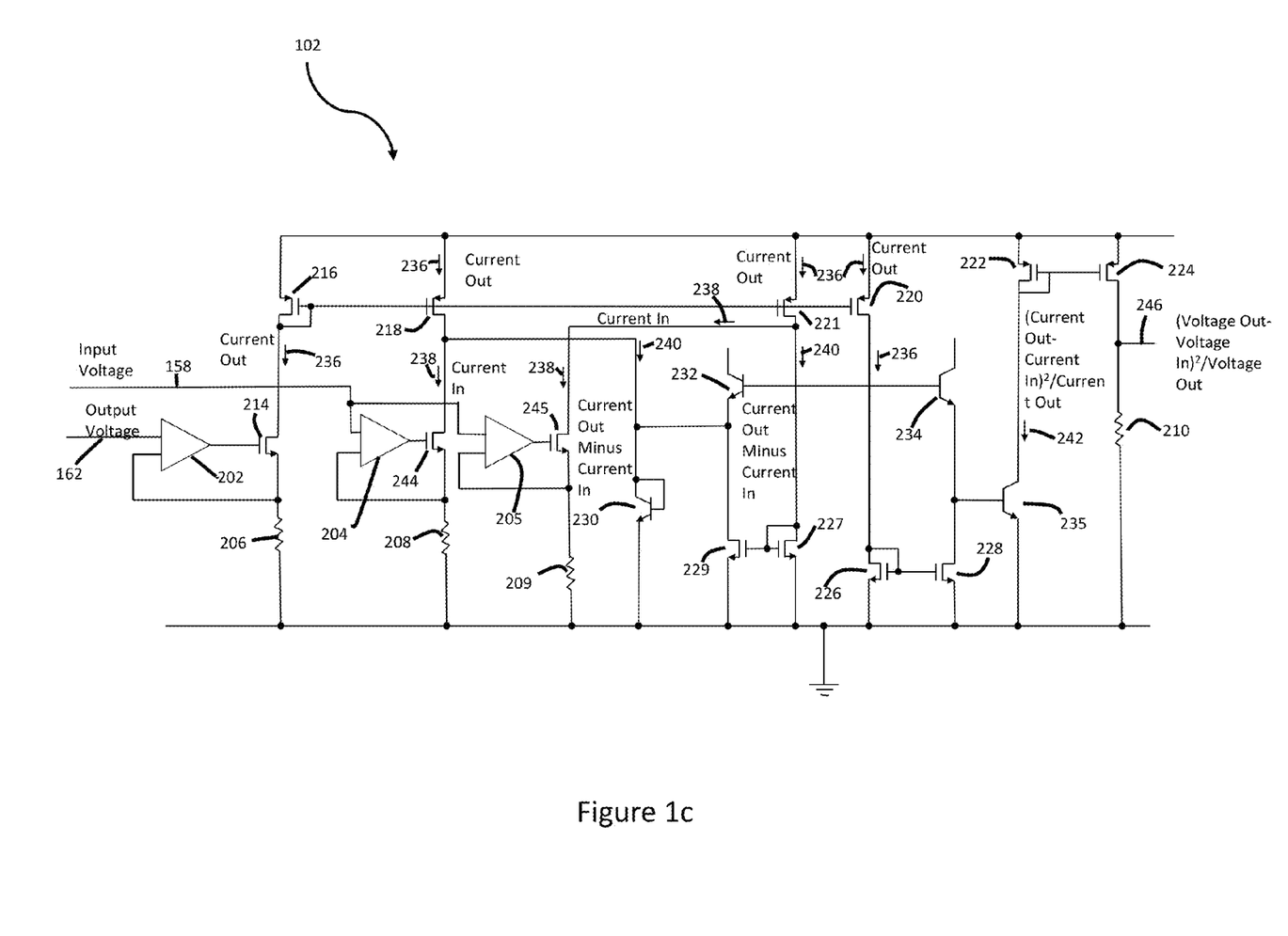

FIGS. 1a-c illustrate an embodiment active power factor corrector (PFC) circuit 100 having an adjustable slope compensation. Active PFC circuit 100 may be a continuous conducting mode (CCM) active PFC, although it may operate in other modes.

FIG. 1a illustrates a high level view of the active PFC circuit. Active PFC circuit 100 functions as a boost converter through control of switch 126 to transfer power to inductor 122 and capacitor 134. Feedback from current sense signal 172 enables a feedback loop to control the current flow to follow the input voltage. The AC input of active PFC circuit 100 has inputs 150 and 152 that are coupled to rectifier 142. Rectifier 142 rectifies signals 150 and 152 to produce rectified input voltage 154. In alternative embodiments, a one phase AC input, two phase AC input or three phase AC input may be used.

Capacitor 140 couples rectified input voltage 154 to ground 156. Resistors 136 and 138 create a voltage divider coupling rectified input voltage 154 and ground 156 to output voltage input voltage 158. Resistors 130 and 132 create a voltage divider coupling output voltage 160 and ground 156 to output voltage output voltage 162. Oscillator 108 outputs oscillator signal 164.

Reference signal 170 and output voltage 162 are the inputs to op amp 114. Op amp 114 outputs op amp output signal 192. Capacitor 116 couples op amp output signal 192 to ground 156. Multiplier 118 multiplies op amp output signal 192 by input voltage 158 to yield multiplier output 176.

Adder 120 adds slope compensation correction signal 166 to multiplier output 176 to yield slope compensation corrected signal 168. Slope compensation correction signal 166 is an output of slope compensation corrector 102. Based on inputs output voltage 162, and input voltage 158, slope compensation corrector 102 determines slope compensation corrected signal 168. Slope compensation corrector 102 may be implemented in analog or digital circuitry. Based on input voltage 158, output voltage 162, slope compensation corrected signal 168, and oscillator signal 164, slope compensation block 104 determines slope compensated signal 174. Slope compensation block 104 may be implemented in analog or digital circuitry. Slope compensated signal 174 and current sense signal 172 are the inputs to comparator 106, which outputs comparator output signal 178. RS latch 110 latches comparator output signal 178 as the reset and oscillator signal 164 as the set, with latch output signal 190 as the Q output. Latch output signal 190 is the input to driver 112, which outputs switch control signal 188.

Switch control signal 188 turns switch 126 on and off. Switch 126 may be a DMOS transistor, or another type of transistor, such as an IGBT or a JFET. Resistor 128 couples switch 126 to ground 156. When switch 126 is turned on, current flows through inductor 122 and energy is stored in inductor 122, yielding current sense signal 172. When switch 126 is turned off, the energy stored in inductor 122 flows across diode 124, capacitor 134 and across output voltage 160 across a load (not pictured). Diode 124 prevents load capacitance from discharging through switch 126. When switch 126 is off, energy flows from inductor 122 to capacitor 134.

FIG. 1b illustrates embodiment slope compensation block 104. Slope compensation block 104 may be used in active PFC circuit 100 or it may be a part of another type of PFC system. Slope compensation block 104 may be implemented in analog or digital circuitry. The inputs to slope compensation block 104 are input voltage 158, output voltage 162, slope compensation corrected signal 168, and oscillator signal 164. The output of slope compensation block 104 is slope compensation signal 174. Switch 180 couples slope compensation corrected signal 168 and current source 184. Oscillator signal 164 controls switch 180. Capacitor 182 also couples slope compensation corrected signal 168 to current source 184 in parallel with switch 180. When switch 180 is closed, current flows from slope compensation corrected signal 168 and current source 184 to slope compensated signal 174. When switch 180 is open, current from slope compensation corrected signal 168 charges capacitor 182, decreasing the current flowing in slope compensated signal 174. In alternative embodiments, slope compensation may be performed using other circuits and methods.

FIG. 1c illustrates an embodiment of slope compensation corrector 102. Slope compensation corrector 102 may be used as a part of active PFC circuit 100, or it may be a part of another PFC system. Analog or digital circuitry may implement slope compensation corrector 102. To maintain a high power factor, slope compensation corrector 102 adjusts for slope compensation.

The voltage across capacitor 182 in FIG. 1b is the slope compensation offset to be compensated for. One mechanism to correct for this voltage is to add a value equal to this offset to a voltage or current signal. The voltage to be compensated is equal to:

$$\frac{I_{sc} \times T_{on}}{C},$$

where $I_{sc}$ represents the current supplied by current source 184, C is the capacitance of capacitor 182, $T_{on}$ is the time on, which is equal to the duty cycle times the period of oscillator signal 164. The duty cycle is defined as:

$$\text{Duty Cycle} = \frac{Vout - Vin}{Vout}.$$

$V_{out}$ may represent output voltage sense 162. $V_{in}$ may represent input voltage 158. Time on is thus equal to:

$$\frac{Period \times (Vout - Vin)}{Vout}.$$

The current in current source 184 is equal to:

Coeff_I×(Vout−Vin).

Coeff_I is a design parameter that represents a current slope. The voltage to be compensated for is thus:

$$\frac{Period \times Coeff\_I \times (Vout - Vin)^2}{Vout \times C}.$$

This equation may be implemented using digital or analog circuitry.

Slope compensation corrector 102 in FIG. 1c illustrates an example of an analog circuit implementation of a slope compensation correction circuit. Op amp 202, transistor 214, and resistor 206 convert output voltage 162 to output current 236, which is equal to output voltage 162 divided by the resistance of resistor 206. Transistors 216, 218, and 221 mirror output current 236. Current mirror 220 mirrors the output current. Op amp 204, transistor 244, and resistor 208 convert input voltage 158 to input current 238, which is proportional to input voltage 158 divided by the resistance of resistor 208. Similarly, op amp 205, transistor 245, and resistor 209 convert input voltage 158 to input current 238. Current 240 is proportional to output current 236 minus input current 238. Transistors 227, 229, 230, 232, 226, 228, 234, and 235 cause current 242 to be proportional to:

$$\frac{(I_{out} - I_{in})^2}{I_{out}}.$$

$I_{out}$ may be represented by output current 236 and $I_{in}$ may be represented by input current 238. Current mirror 222 mirrors the current. Transistor 224 and resistor 210 convert current 242 to voltage 246 which is proportional to:

$$\frac{((V_{out} - V_{in})^2}{V_{out}}.$$

Figure 2:
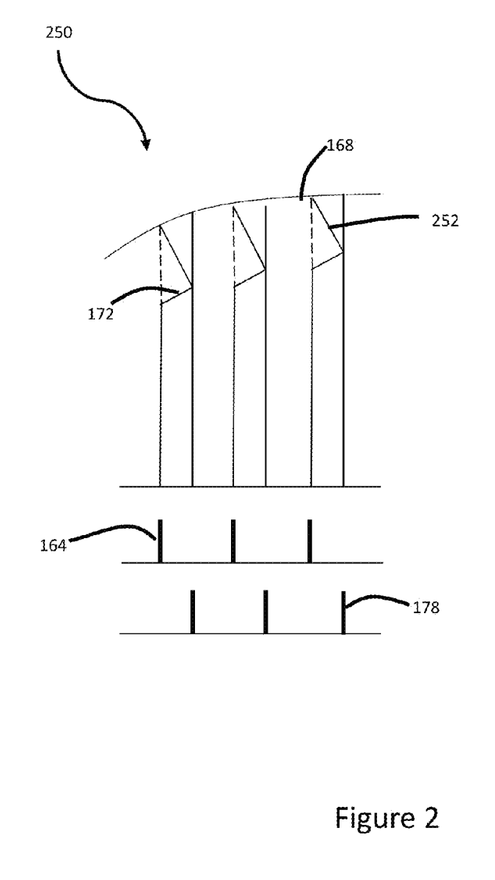
FIG. 2 illustrates a waveform diagram of the slope compensation corrected signal, slope compensation reference signal, current signal, oscillator signal, and comparator output signal for an embodiment of an active PFC circuit.

FIG. 2 illustrates a waveform diagram 250 of slope compensation corrected signal 168, slope compensation reference signal 252, current sense signal 172, oscillator signal 164, and comparator output signal 178, for an embodiment of an active PFC circuit. Slope compensation signal 252 begins equal to slope compensation corrected signal 168. When oscillator signal 164 pulses, slope compensation signal 252 decreases, while current sense signal 172 increases. When current sense signal 172 equals slope compensation signal 252, comparator output signal pulses and slope compensation signal 252 returns to slope compensation corrected signal 168.

Figure 3A:
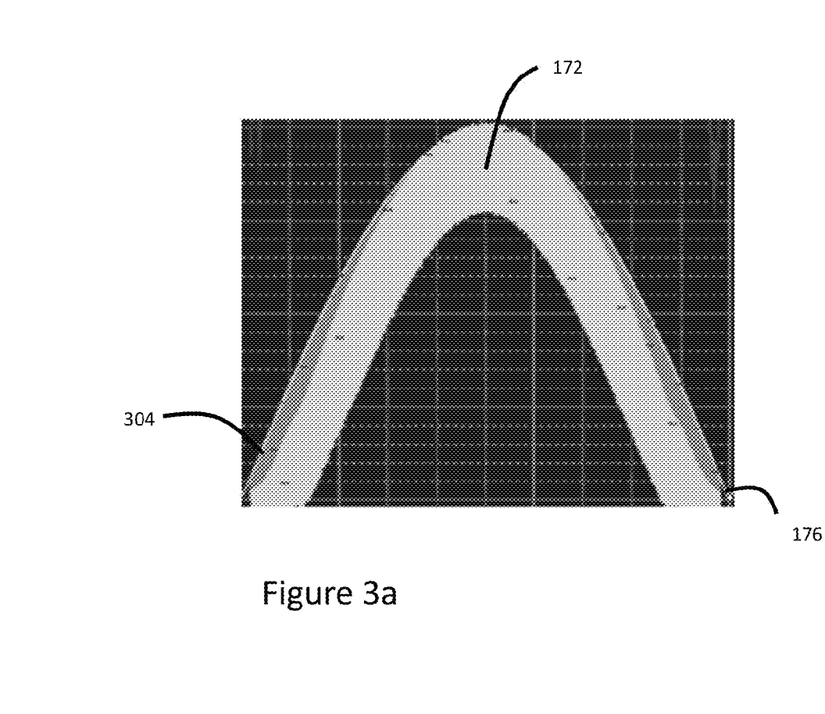
FIGS. 3a-d illustrate results of simulations of embodiments of an active PFC circuit.
Figure 3B:
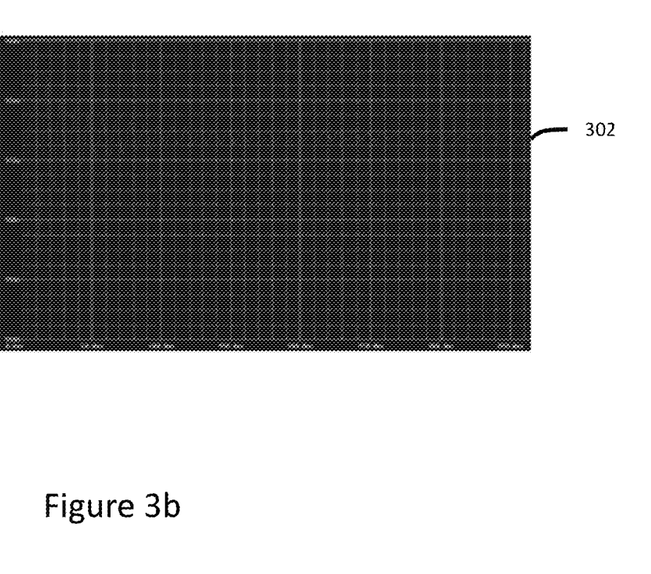

FIGS. 3a-d illustrate simulation results of an embodiment active PFC circuit. FIGS. 3a and 3b illustrate simulation results for an embodiment PFC with a slope compensated signal without slope compensation correction. Current sense signal 172 fluctuates near multiplier output 176. The power factor reduction caused by slope compensation factor 304 is large for a large duty cycle of more than about ½. FIG. 3b depicts power factor 302 of an embodiment which is around 97%.

Figure 3C:
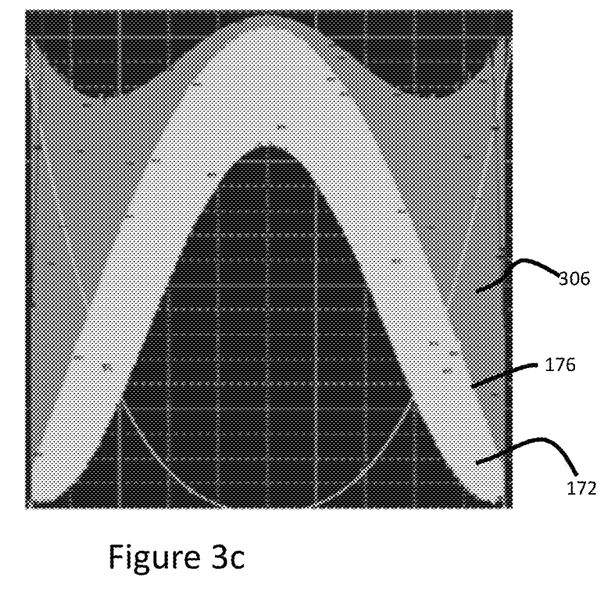
Figure 3D:
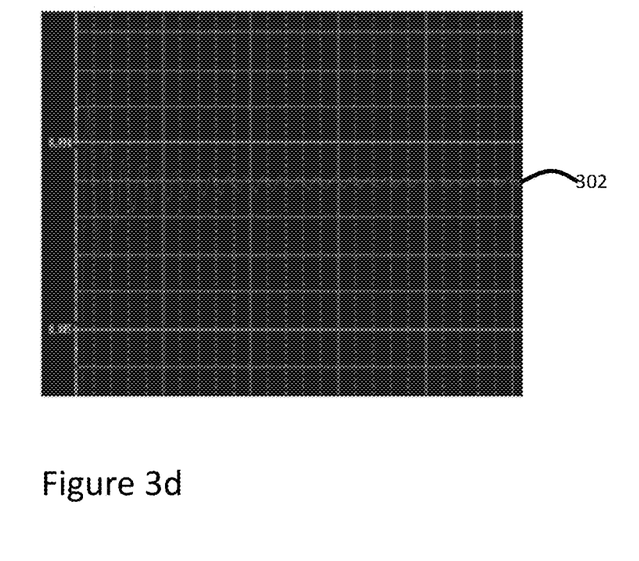

FIGS. 3c and 3d illustrate simulation results for an embodiment with a slope compensated signal and with slope compensation correction. Current sense signal 172 shows a more uniform shape while slope compensation correction 306 is largest for a large duty cycle. Power factor 302 of an embodiment is almost 99%.

Figure 4:
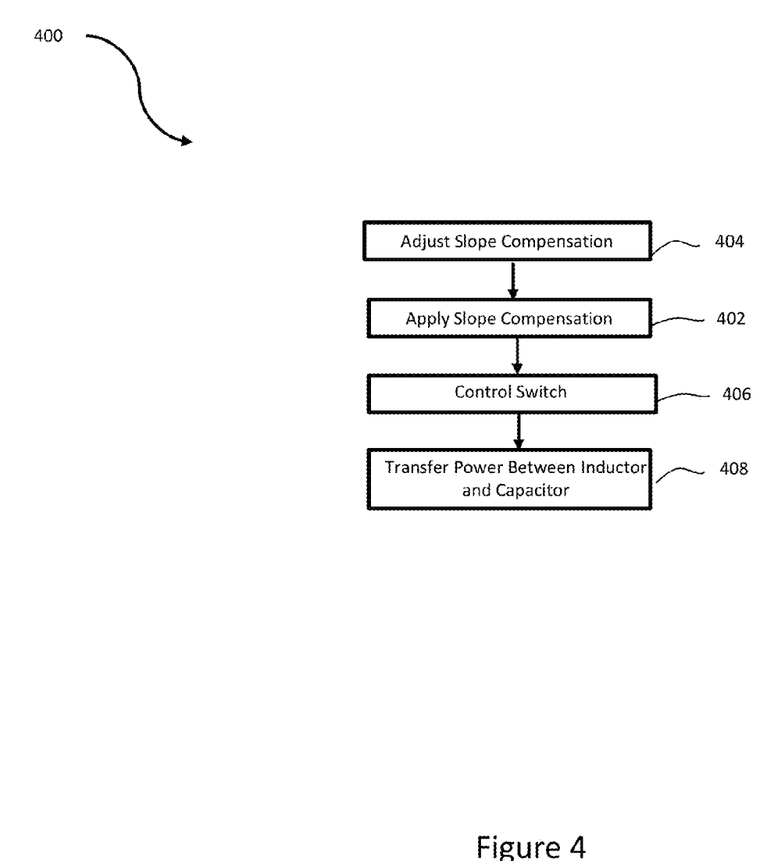
FIG. 4 illustrates a flowchart for an embodiment method for controlling an active PFC circuit.

FIG. 4 illustrates a flowchart of method 400 for an embodiment active PFC circuit. Method 400 of controlling a power factor corrector includes adjusting slope compensation (step 404), applying slope compensation (step 402), controlling a switch (step 406), and transferring power between an inductor and a capacitor (step 408). Applying slope compensation may be performed by adjusting a duty cycle as the duty cycle increases to improve stability. Adjusting slope compensation involves adjusting the signal to correct for the error introduced by slope compensation. Transferring power between an inductor and a capacitor involves, when a switch is turned on, energy flows to an inductor, and when the switch is turned off, energy flows from the inductor to the capacitor.

Advantages of embodiments include an ability to adjust for slope compensation in an active PFC circuit to improve the power factor. The slope compensation correction can be obtained either with an analog or digital implementation.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of controlling a power factor corrector, the method comprising:
    applying slope compensation to a reference signal in a power factor corrector; and
    adjusting the slope compensation based on a square of a difference between an output voltage of the power factor corrector and an input voltage of the power factor corrector.

2. The method of claim 1, wherein the method further comprises controlling a switch with the slope compensated reference signal.

3. The method of claim 2, wherein the method further comprises transferring power from an inductor to a capacitor.

4. The method of claim 1, wherein applying slope compensation to the reference signal in the power factor corrector comprises:
    opening a switch to disconnect the reference signal from a current source;
    charging a capacitor that is in series with the current source;
    creating a corrected signal based on the charged capacitor and the reference signal; and
    comparing a current signal to a corrected signal.

5. The method of claim 1, wherein adjusting the slope compensation comprises:
    subtracting the input voltage of the power factor corrector from the output voltage of the power factor corrector to obtain a voltage difference;
    dividing the voltage difference by the output voltage to obtain a duty cycle;
    multiplying the duty cycle by a period to obtain a time on;
    multiplying the voltage difference by a current coefficient to obtain a capacitor current;
    multiplying the capacitor current by the time on and dividing by a capacitance of a capacitor to form an adjustment factor; and
    adjusting the slope compensation according to the adjustment factor.

6. A device comprising a controller configured to apply slope compensation to a reference signal in a power factor corrector and to adjust the slope compensation based on a square of a difference between an output voltage of the power factor corrector and an input voltage of the power factor corrector.

7. The device of claim 6, wherein the power factor corrector is configured to operate in a continuous conduction mode.

8. The device of claim 6, wherein the controller is configured to calculate the slope compensation based on a duty cycle of the power factor corrector.

9. The device of claim 6, wherein the controller further comprises:
    a switch controlled by an oscillator;
    a capacitor coupled in parallel with the switch;
    a current source coupled to the capacitor; and
    a first input of a comparator coupled to the capacitor, a second input of the comparator coupled to a current signal of the power factor corrector.

10. The device of claim 6, wherein the controller is configured to add a reference signal and a correction factor:

$$\frac{period * Coeff\_I(V_{out} - V_{in})^2}{C * V_{out}}$$

where $V_{out}$ is an output voltage and $V_{in}$ is an input voltage, C is a capacitance of a capacitor, period is a period of an oscillator, and Coeff_I is a current slope.

11. The device of claim 6, wherein the controller comprises digital electronics.

12. The device of claim 6, wherein the controller comprises analog electronics.

13. The device of claim 12, wherein the controller comprises:
    a first voltage to current converter;
    a first current mirror coupled to the first voltage to current converter;

a second voltage to current converter;
a second current mirror coupled to the second voltage to current converter;
a current subtractor, a first input of the current subtractor coupled to the first current mirror, and a second input of the current subtractor coupled to the second current mirror;
a current divider, a first input of the current divider coupled to an output of the current subtractor, a first output of the current divider coupled to the first current mirror; and
a current to voltage converter coupled to an output of the current divider.

14. The device of claim 12, wherein the controller further comprises:
a multiplier coupled to a slope compensation block, inputs to the multiplier being an input voltage signal and an op-amp output signal;
an op-amp coupled to the multiplier;
a reference signal coupled to the op-amp;
an output voltage signal coupled to the op-amp;
a comparator coupled to the slope compensation block, an input of the comparator being a signal proportional to an inductor current in the power factor corrector;
a latch coupled to the comparator;
an oscillator coupled to the latch;
an output of the latch coupled to a driver; and
a driver configured to be coupled to a switch of the power factor corrector.

15. A power factor corrector circuit comprising:
an AC input node of a power factor corrector coupled to a controller;
a DC output node of the power factor corrector coupled to the controller;
the controller configured to
apply slope compensation to a reference signal in a power factor corrector, and
adjust the slope compensation based on a square of a difference between a voltage of the DC output node and a voltage of the AC input node;
a switch coupled to the controller; and
an inductor coupled to the switch.

16. The power factor corrector circuit of claim 15, further comprising:
a first voltage divider coupled between an output node of the power factor corrector circuit and a ground, an output of the first voltage divider coupled to an input of the controller; and
a second voltage divider coupled between an input voltage of the power factor corrector circuit and a ground node, an output of the second voltage divider coupled to an input of the controller.

17. The power factor corrector circuit of claim 15, further comprising a rectifier coupled to the inductor.

18. The power factor corrector circuit of claim 15, wherein the controller is configured to calculate the slope compensation based on a duty cycle of the power factor corrector.

19. The power factor corrector circuit of claim 18, wherein the controller is configured to add a reference signal to a correction factor configured to correct for an error introduced by the slope compensation:

$$\frac{\text{period} * \text{Coeff\_I}(V_{out} - V_{in})^2}{C * V_{out}}$$

where $V_{out}$ is an output voltage and $V_{in}$ is an input voltage, C is a capacitance of a capacitor, period is a period of an oscillator, and Coeff_I is a current slope.

20. A method of controlling a power factor corrector, the method comprising:
applying slope compensation to a reference signal in a power factor corrector, wherein applying slope compensation to the reference signal in the power factor corrector comprises
opening a switch to disconnect the reference signal from a current source,
charging a capacitor that is in series with the current source,
creating a corrected signal based on the charged capacitor and the reference signal, and
comparing a current signal to the corrected signal; and
adjusting the slope compensation based on an input voltage of the power factor corrector.

21. A device comprising a controller configured to apply slope compensation to a reference signal in a power factor corrector and to adjust the slope compensation based on an input voltage of the power factor corrector, wherein the controller further comprises:
a first switch controlled by an oscillator;
a capacitor coupled in parallel with the first switch;
a current source coupled to the capacitor; and
a first input of a comparator coupled to the capacitor, a second input of the comparator directly coupled to a terminal of a second switch of the power factor corrector, wherein a gate of the second switch is coupled to an output of the comparator, and the terminal of the second switch is configured to provide a signal proportional to a current of the power factor corrector.

* * * * *